(12) United States Patent
Oka et al.

(10) Patent No.: US 12,498,684 B2
(45) Date of Patent: Dec. 16, 2025

(54) ESTIMATION DEVICE AND ESTIMATION METHOD

(71) Applicant: MITSUBISHI HEAVY INDUSTRIES, LTD., Tokyo (JP)

(72) Inventors: Hirotaka Oka, Tokyo (JP); Masumi Nomura, Tokyo (JP); Tatsuo Ishiguro, Tokyo (JP); Katsuaki Morita, Tokyo (JP); Ryuji Ikeda, Tokyo (JP); Kenichi Nagahara, Tokyo (JP); Sota Kogawa, Tokyo (JP); Noriyuki Matsukura, Tokyo (JP); Satoshi Nikaido, Tokyo (JP); Yuki Nishizaki, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 404 days.

(21) Appl. No.: 18/017,535

(22) PCT Filed: Jul. 29, 2021

(86) PCT No.: PCT/JP2021/027996
§ 371 (c)(1),
(2) Date: Jan. 23, 2023

(87) PCT Pub. No.: WO2022/025145
PCT Pub. Date: Feb. 3, 2022

(65) Prior Publication Data
US 2023/0315028 A1 Oct. 5, 2023

(30) Foreign Application Priority Data
Jul. 31, 2020 (JP) .................................. 2020-130787

(51) Int. Cl.
*G05B 13/04* (2006.01)

(52) U.S. Cl.
CPC .................................. *G05B 13/042* (2013.01)

(58) Field of Classification Search
None
See application file for complete search history.

(56) References Cited

U.S. PATENT DOCUMENTS 6,106,785 A    8/2000   Havlena et al.
2009/0132626 A1*   5/2009   Ide ........................ G05B 23/024
                                                    708/443

(Continued)

FOREIGN PATENT DOCUMENTS

JP          4002305 B2     10/2007
WO   2015-019499 A1     2/2015

OTHER PUBLICATIONS

Durrant-Whyte, "Consistent Integration and Propagation of Disparate Sensor Observations", 1987, The International Journal of Robotics Research vol. 6 No. 3, pp. 3-24 (Year: 1987).*

(Continued)

*Primary Examiner* — David Earl Ogg
(74) *Attorney, Agent, or Firm* — Osha Bergman Watanabe & Burton LLP

(57) ABSTRACT

An estimation device includes an observation system constraint determination unit configured to determine data within constraints that is data within a first constraint based on time series data of each observation value of a first observation value observed by a first observation system and a second observation value observed by a second observation system, a model estimation unit configured to estimate parameters of a plurality of models including an observation model that is a model of each of the observation systems and a physical model that is a model within an apparatus provided with each of the observation systems based on the data within constraints, and a consistency determination unit configured to determine consistency of the models based on (Continued)

a deviation between a first predicted observation value predicted from the second observation system based on the estimated parameters and the first observation value.

6 Claims, 17 Drawing Sheets

(56) References Cited

U.S. PATENT DOCUMENTS

| | | | |
|---|---|---|---|
| 2015/0039254 A1* | 2/2015 | Hidai | G01R 19/2516 702/60 |
| 2019/0095556 A1* | 3/2019 | Satoh | G16H 50/50 |
| 2020/0302094 A1* | 9/2020 | Greenwood | G06N 3/126 |

OTHER PUBLICATIONS

Sha et al, "Modeling Data Consistency in Wireless Sensor Networks", 2007, 27th International Conference on Distributed Computing Systems Workshops, pp. 1-6 (Year: 2007).*
International Search Report in corresponding International Application No. PCT/JP2021/027996, dated Oct. 26, 2021 (4 pages).
Written Opinion in corresponding International Application No. PCT/JP2021/027996, dated Oct. 26, 2021 (6 pages).

* cited by examiner

FIG. 4

| OFFSET ERROR | SCALE FACTOR ERROR | NON-LINEAR ERROR | DEAD INTERVAL |
|---|---|---|---|
| 0 POINT DEVIATION<br>INTERNAL FACTOR, STATIC | LINEAR SENSITIVITY DEVIATION<br>INTERNAL FACTOR, STATIC | NON-LINEAR SENSITIVITY DEVIATION<br>INTERNAL FACTOR, STATIC | INPUT INTERVAL WHERE OUTPUT IS 0<br>INTERNAL FACTOR, STATIC |
| TIME CONSTANT DELAY | DELAY CHANGE DUE TO EXTERNAL FACTOR | SENSITIVITY TO EXTERNAL FACTOR | SENSITIVITY CHANGE DUE TO EXTERNAL FACTOR |
| RESPONSE DELAY<br>INTERNAL FACTOR, DYNAMIC | HEAT TRANSFER RATE CHANGE<br>DUE TO FLOW AND THE LIKE<br>EXTERNAL FACTOR, DYNAMIC | BAROMETRIC PRESSURE VARIATION FOR<br>ABSOLUTE PRESSURE ESTIMATION WITH<br>GAUGE PRESSURE SYSTEM<br>EXTERNAL FACTOR, STATIC | EXTERNAL RADIATION WITH<br>RESPECT TO TEMPERATURE AND THE LIKE<br>EXTERNAL FACTOR, STATIC |

FULL-SCALE ERROR

INDICATED VALUE ERROR

ESTIMATION DEVICE AND ESTIMATION METHOD

TECHNICAL FIELD

The present disclosure relates to an estimation device, an estimation method, and a recording medium storing a program.

Priority is claimed on Japanese Patent Application No. 2020-130787, filed Jul. 31, 2020, the content of which is incorporated herein by reference.

BACKGROUND ART

In an apparatus such as a large refrigerator and a submersible pump, it is known to monitor a state inside the apparatus by providing an observation system such as a sensor or a measuring instrument.

For example, Patent Document 1 discloses a provision of a sensor in a nuclear power plant.

CITATION LIST

Patent Document

Patent Document 1

PCT International Publication No. WO 2015/019499

SUMMARY OF INVENTION

Technical Problem

A facility disclosed in Patent Document 1 has an environmental sensor for monitoring environmental conditions in which a sensor is installed, and evaluates the soundness of the sensor.

However, when the sensor indicates an abnormality regardless of the environmental conditions, a determination device disclosed in Patent Document 1 may not be able to evaluate the consistency of observation values of the sensor.

For this reason, the facility disclosed in Patent Document 1 may not be able to estimate the consistency of observation values.

The present disclosure has been made to solve the problems described above, and an object thereof is to provide an estimation device, an estimation method, and a recording medium storing a program that make it easy to estimate the consistency of observation values.

Solution to Problem

To solve the problems described above, an estimation device according to the present disclosure includes an observation system constraint determination unit configured to determine data within constraints that is data within a first constraint based on time series data of each observation value of a first observation value observed by a first observation system and a second observation value observed by a second observation system, a model estimation unit configured to estimate parameters of a plurality of models including an observation model that is a model of each of the observation systems and a physical model that is a model within an apparatus provided with each of the observation systems based on the data within constraints, and a consistency determination unit configured to determine consistency of the models based on a deviation between a first predicted observation value predicted from the second observation system based on the estimated parameters and the first observation value.

An estimation method according to the present disclosure includes a step of determining data within constraints that is data within a first constraint based on time series data of each observation value of a first observation value observed by a first observation system and a second observation value observed by a second observation system, a step of estimating parameters of a plurality of models including an observation model that is a model of each of the observation systems and a physical model that is a model within an apparatus provided with each of the observation systems based on the data within constraints, and a step of determining consistency of the models based on a deviation between a first predicted observation value predicted from the second observation system based on the estimated parameters and the first observation value.

A non-transitory computer-readable recording medium that stores a program according to the present disclosure causes a computer of an estimation device to execute a step of determining data within constraints that is data within a first constraint based on time series data of each observation value of a first observation value observed by a first observation system and a second observation value observed by a second observation system, a step of estimating parameters of a plurality of models including an observation model that is a model of each of the observation systems and a physical model that is a model within an apparatus provided with each of the observation systems within constraints, and a step of determining consistency of the models based on a deviation between a first predicted observation value predicted from the second observation system based on the estimated parameters and the first observation value.

Advantageous Effects of Invention

According to the estimation device, the estimation method, and the recording medium storing the program of the present disclosure, it is easy to estimate the consistency of observation values.

BRIEF DESCRIPTION OF DRAWINGS

FIG. 4 is a diagram which describes an observation model according to the first embodiment.

DESCRIPTION OF EMBODIMENTS

Figure 1:
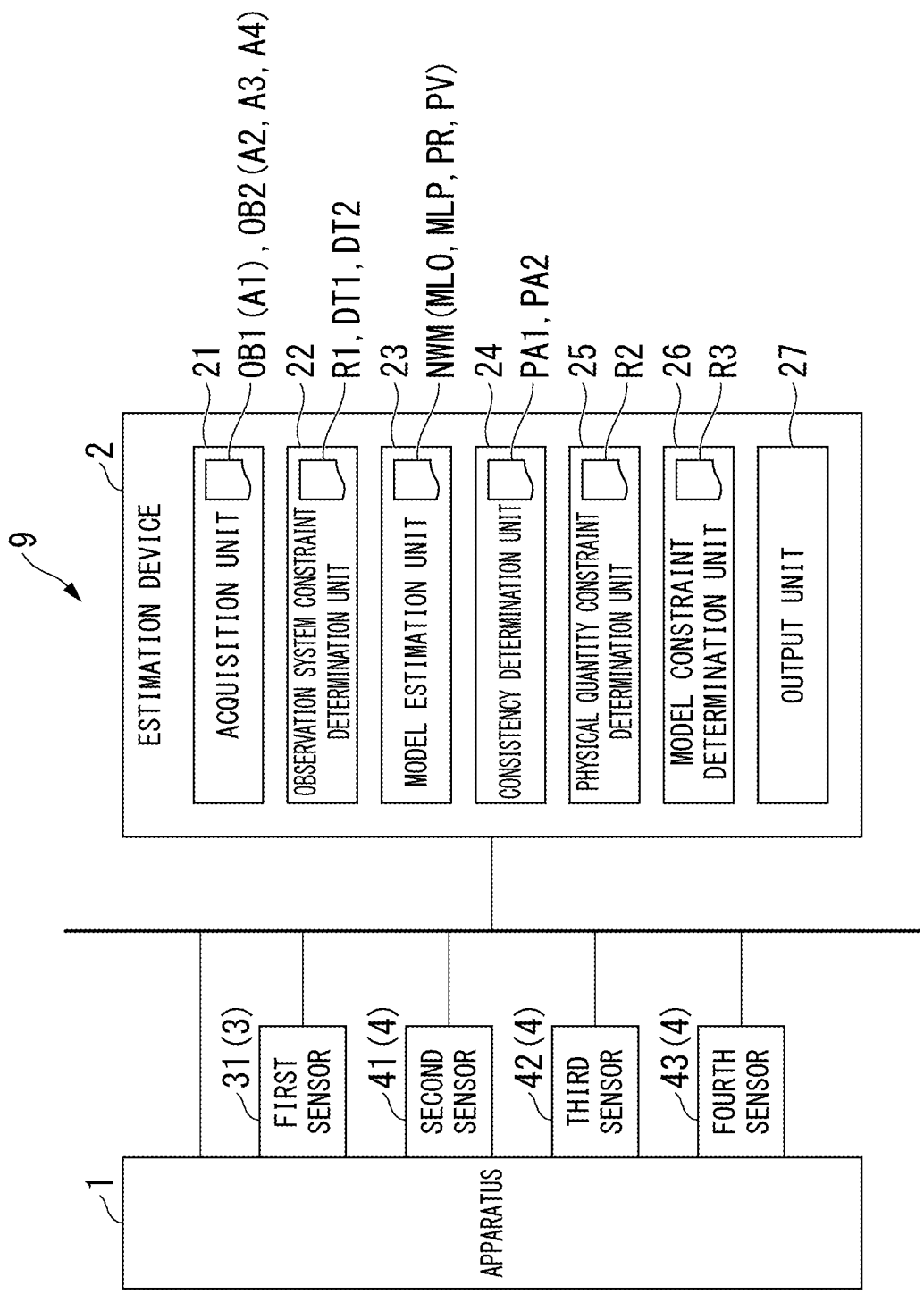
FIG. 1 is a block diagram of an observation device according to a first embodiment.

Hereinafter, embodiments according to the present disclosure will be described with reference to the drawings. The same reference numerals are given to the same or corresponding constituents in all the drawings, and common description thereof will be omitted.

First Embodiment (Overall Configuration)

FIG. 1 is an overall configuration of a facility 9 according to a first embodiment.

The facility 9 includes an apparatus 1, an estimation device 2, a first observation system 3, and a second observation system 4.

The apparatus 1 is, for example, a large refrigerator, a submersible pump, a plant, or the like.

For example, the apparatus 1, the estimation device 2, the first observation system 3, and the second observation system 4 may be connected to each other by wire or wirelessly, and may be able to communicate with each other.
(Configuration of First Observation System)

The first observation system 3 is a system for observing a state of the apparatus 1.

The first observation system 3 observes a first observation value OB1.

For example, the first observation system 3 may be provided in the apparatus 1.

For example, the first observation system 3 may include a first sensor 31.

For example, the first observation system 3 may observe an observation value A1 as the first observation value OB1.

For example, the first sensor 31 may be, for example, provided inside the apparatus 1. At that time, the first sensor 31 may be a pressure sensor that measures an internal pressure of the apparatus 1 as the observation value A1.
(Configuration of Second Observation System)

A second observation system 4 is a system for observing the state of the apparatus 1.

The second observation system 4 observes a second observation value OB2.

For example, the second observation system 4 may be another observation system independent of the first observation system 3.

For example, the second observation value OB2 may also be an observation value different from the first observation value OB1.

For example, the second observation system 4 may be provided in the apparatus 1.

For example, the second observation system 4 may include a second sensor 41, a third sensor 42, and a fourth sensor 43.

For example, the second observation system 4 may also observe observation values A2, A3, and A4 as the second observation value OB2.

The second sensor 41 may be provided, for example, at an outlet of the apparatus 1. At this time, the second sensor 41 may be a thermometer that measures an outlet temperature, which is a temperature of fluid such as liquid or gas flowing out from the apparatus 1, as an observation value A2.

In addition, the third sensor 42 may be provided, for example, at an inlet of the apparatus 1. At this time, the third sensor 42 may be a thermometer that measures an inlet temperature, which is a temperature of fluid such as liquid or gas flowing into the apparatus 1, as the observation value A3.

Moreover, the fourth sensor 43 may be provided, for example, in the apparatus 1. At this time, the fourth sensor 43 may be a flow meter that measures a flow rate in an apparatus, which is a flow rate of fluid such as liquid or gas flowing through the apparatus 1, as an observation value A4.
(Configuration of Estimation Device)

The estimation device 2 is a device for estimating a parameter PR of each model of the apparatus 1, the first observation system 3, and the second observation system 4.

For example, the estimation device 2 may be a device for developing an asset management service by monitoring of the apparatus 1.

The estimation device 2 includes an observation system constraint determination unit 22, a model estimation unit 23, and a consistency determination unit 24.

For example, the estimation device 2 may further include a physical quantity constraint determination unit 25 and a model constraint determination unit 26.

In addition, the estimation device 2 may further include an acquisition unit 21 and an output unit 27.
(Configuration of Acquisition Unit)

The acquisition unit 21 acquires the first observation value OB1.

For example, the acquisition unit 21 may acquire the observation value A1 from the first observation system 3 as the first observation value OB1.

For example, the acquisition unit 21 may acquire an internal pressure of the apparatus 1 measured by the first sensor 31 as the observation value A1.

The acquisition unit 21 acquires the second observation value OB2.

For example, the acquisition unit 21 may also acquire observation values A2, A3, and A4 from the second observation system 4 as the second observation value OB2.

For example, the acquisition unit 21 may acquire the outlet temperature measured by the second sensor 41 as the observation value A2.

For example, the acquisition unit 21 may also acquire the inlet temperature measured by the third sensor 42 as the observation value A3.

For example, the acquisition unit 21 may acquire the flow rate in an apparatus measured by the fourth sensor 43 as the observation value A4.

(Configuration of Observation System Constraint Determination Unit)

The observation system constraint determination unit 22 determines data within constraints DT2 that is data within a first constraint R1 from time series data DT1 of each observation value of the first observation value OB1 observed by the first observation system 3 and the second observation value OB2 observed by the second observation system 4.

By determining whether each observation system itself satisfies the constraint conditions, the observation system constraint determination unit 22 determines whether each observation value itself is data that behaves abnormally.

Figure 2:
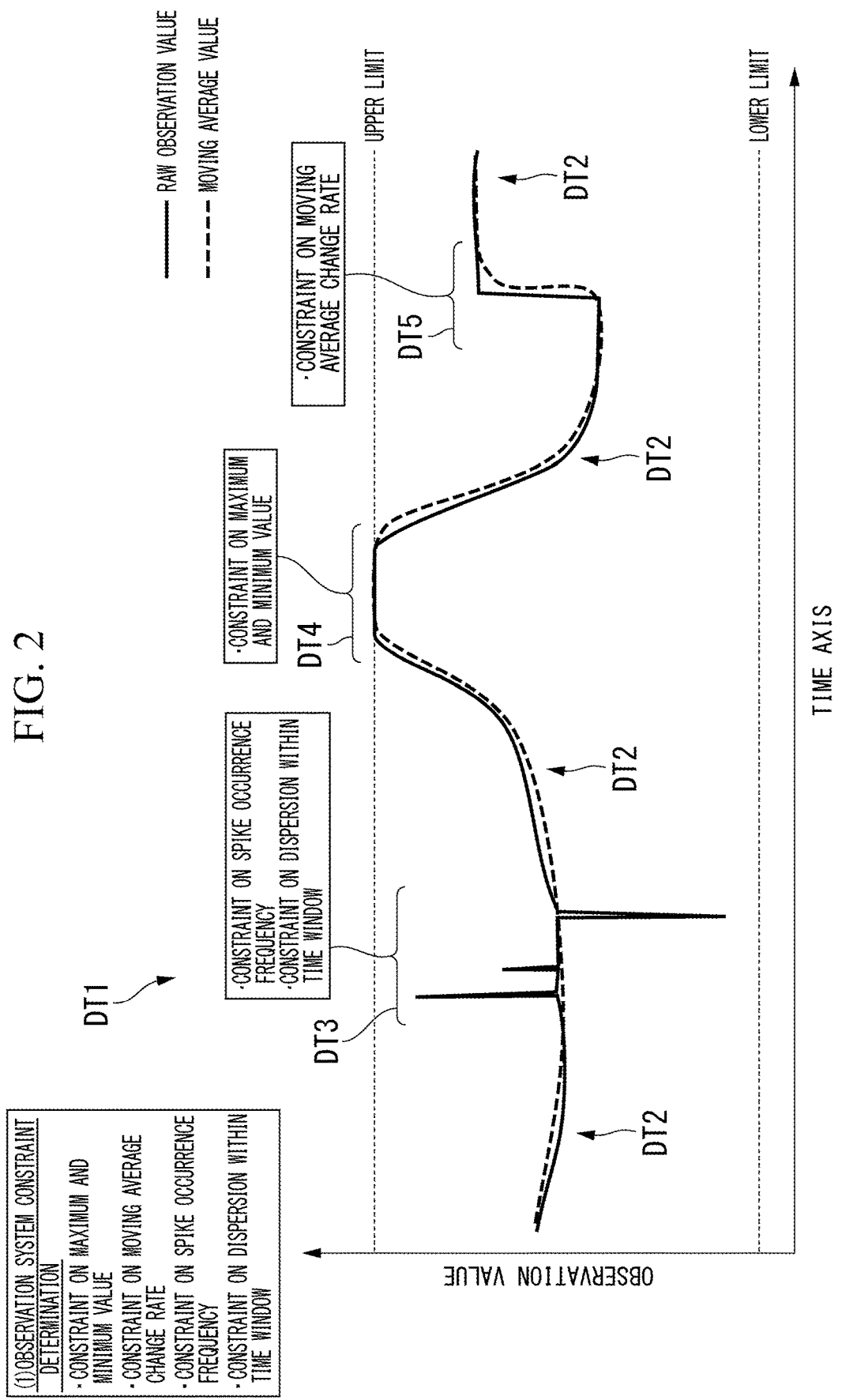
FIG. 2 is a graph which describes a function of an observation system constraint determination unit according to the first embodiment.

For example, as shown in FIG. 2, the observation system constraint determination unit 22 may also determine the data within constraints DT2 according to observation system constraints such as a constraint on maximum and minimum values, a constraint on a moving average change rate, a constraint on a spike occurrence frequency, a constraint on dispersion within a time window, and the like as the first constraint R1.

As a result, the observation system constraint determination unit 22 determines that a record containing an abnormal value that is viewed as an observation value alone is abnormal on the basis of a measure principle (physical law) of each observation system itself.

For example, in the case of FIG. 2, among the time series data DT1 which is time series data of raw observation values observed by each observation system, data DT3 is determined to be outside of the constraints by the first constraint R1, as data in which the spike occurrence frequency of an observation value is higher than a specified threshold value, or data in which dispersion of observation values within a time window is higher than a specified threshold value.

Similarly, data DT4 among the time series data DT1 is determined to be outside of the constraints by the first constraint R1, as data whose observation value is larger than a maximum value specified by an upper limit value or smaller than a minimum value specified by a lower limit value.

Similarly, data DT5 among the time series data DT1 is determined to be outside of the constraints by the first constraint R1, as data whose moving average change rate is greater than a specified threshold value.

On the other hand, data that is not outside of the constraints is determined as the data within constraints DT2.

For example, when data is determined to be outside of the constraints in any one of the observation systems, the observation system constraint determination unit 22 determines that data of the other observation systems at the same time is also outside of the constraints, and subsequent processing in the estimation device 2 may not be performed.

(Configuration of Model Estimation Unit)

The model estimation unit 23 estimates the parameters PR of a plurality of models including an observation model MLO, which is a model of each observation system, and a physical model MLP, which is a model in the apparatus 1 where the observation system is provided, on the basis of the data within constraints DT2.

For example, the model estimation unit 23 may include a network model NWM including a plurality of observation models MLO and a plurality of physical models MLP.

For example, each model of the plurality of observation models MLO and the plurality of physical models MLP may include the parameter PR.

Figure 3:
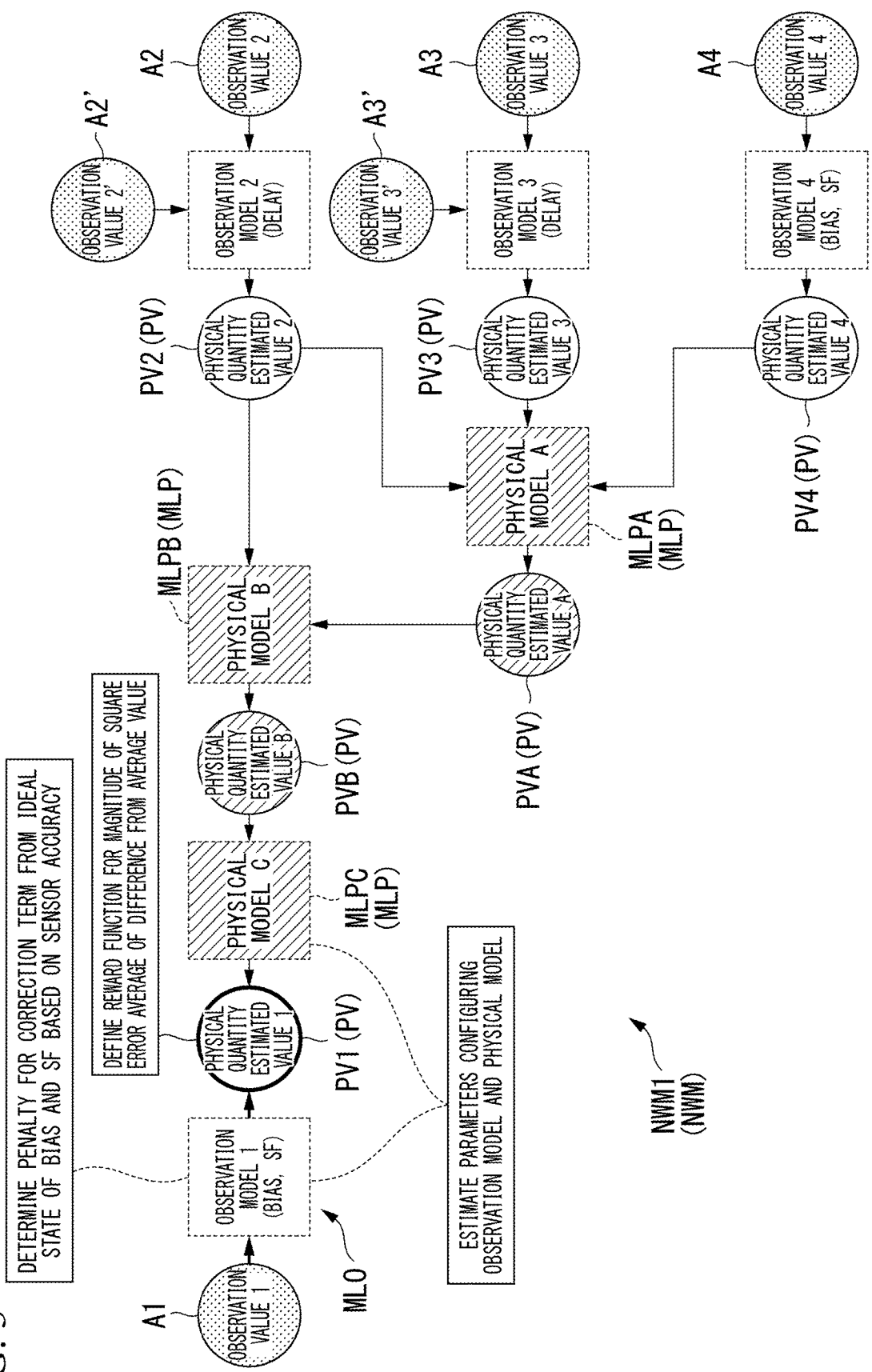
FIG. 3 is a diagram which describes a function of a model estimation unit according to the first embodiment.

For example, the model estimation unit 23 may estimate the parameter PR of each model of the observation model MLO and the physical model MLP in a network model NWM1 as shown in FIG. 3, which is an example of the network model NWM.

As shown in FIG. 3, in the network model NWM1, the model estimation unit 23 can estimate a physical quantity estimated value PV1, which is one of a plurality of physical quantity estimated values PV, based on the observation value A1 via one observation model MLO.

On the other hand, in the network model NWM1, the model estimation unit 23 can estimate the physical quantity estimated value PV1 based on the observation value A2, the observation value A3, and the observation value A4 via the plurality of observation models MLOs and the plurality of physical models MLPs.

That is, in the network model NWM1, the model estimation unit 23 can estimate a common physical quantity estimated value PV1 from different systems.

The physical quantity estimated value PV is a physical quantity within the apparatus 1 estimated based on the parameter PR.

As shown in FIG. 3, for example, in the model estimation unit 23, the parameter PR of the observation model MLO regarding the observation value A2 may also be estimated based on the observation value A2 and an observation value A2' before a step of observing the observation value A2 (an observation value A2' observed at a time immediately before the observation value A2 is observed).

Similarly, in the model estimation unit 23, the parameter PR of the observation model MLO regarding the observation value A3 may also be estimated based on the observation value A3 and an observation value A3' before a step of observing the observation value A3 (the observation value A3' observed at a time immediately before the observation value A3 is observed).

(Configuration of Model)

For example, each model of the observation model MLO and the physical model MLP may be expressed in a form of a nonlinear polynomial based on theoretical and empirical formulas, respectively. At that time, a coefficient of the polynomial corresponds to the parameter PR, which is a parameter for expressing an actual variation of the apparatus 1.

Here, the physical model MLP will be explained in detail.

For example, each physical model MLP may be a model derived from a known pure physical law in a physical phenomenon.

For example, a physical model MLPA shown in FIG. 3 may be a model that can calculate a physical quantity estimated value PVA that indicates an amount of work within the apparatus 1 such as refrigeration capacity based on a physical quantity estimated value PV2, which indicates the outlet temperature, a physical quantity estimated value PV3, which indicates the inlet temperature, and a physical quantity estimated value PV4, which indicates the flow rate in the apparatus.

For example, a physical model MLPB shown in FIG. 3 may be a model that can calculate a physical quantity estimated value PVB that indicates a saturated temperature of a fluid such as liquid, gas, or the like in the apparatus 1 based on the physical quantity estimated value PV2 that indicates the outlet temperature and the physical quantity estimated value PVA that indicates the amount of work.

For example, the physical model MLPC shown in FIG. 3 may also be a model that can calculate the physical quantity estimated value PV1 that indicates a pressure of the fluid in liquid, gas, or the like (the saturated vapor pressure) in the apparatus 1 based on the physical quantity estimated value PVB that indicates the saturation temperature of the fluid such as liquid, gas, or the like in the apparatus 1.

Next, an observation model MLO will be described in detail.

For example, each observation model MLO may also be a representative model as shown in FIG. 4.

In FIG. 4, an error with a true value caused by characteristics of a sensor is represented as an internal factor, and an error caused by a factor other than a value to be observed is represented as an external factor.

In addition to the internal and external factors which can be modeled, the observation value is further affected by a random noise component.

In addition, it is necessary to assume that the external factor is "so small that it can be ignored," "measured with another sensor," or "the amount of data that can be treated as noise."

Figure 5:
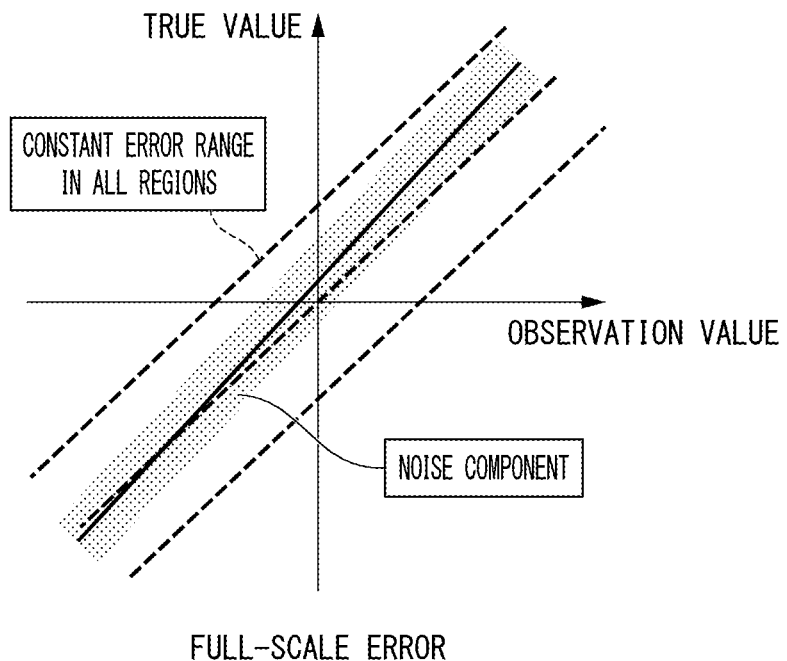
FIG. 5 is a diagram which describes a full scale error.
Figure 6:
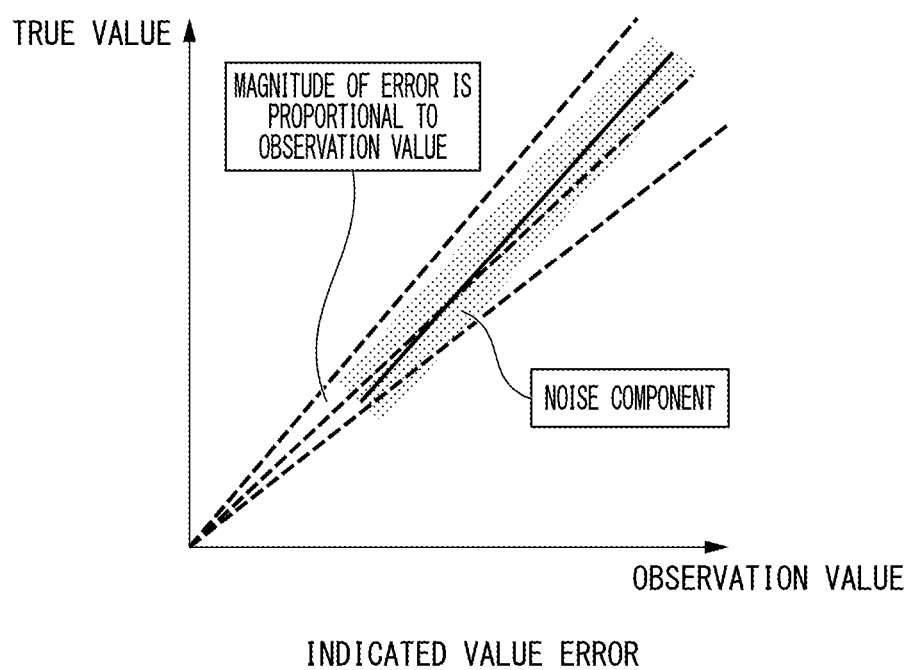
FIG. 6 is a diagram which describes an indicated value error.

In the observation model MLO, an accuracy of the observation system is defined by one of a full scale error ($\pm$_% F.S.) as shown in FIG. 5 and an indicated value error ($\pm$_% R.D.) shown in FIG. 6, or an index obtained by combining these after considering all errors.

It should be noted that a range of these errors is an accuracy at the time of a normal operation, and these errors will deviate from this range when the sensor is misaligned or failure occurs.

In addition, when the same value is continuously measured, a magnitude of the variation in the result of comparing time window averaged values to each other is called Allan dispersion.

Figure 7:
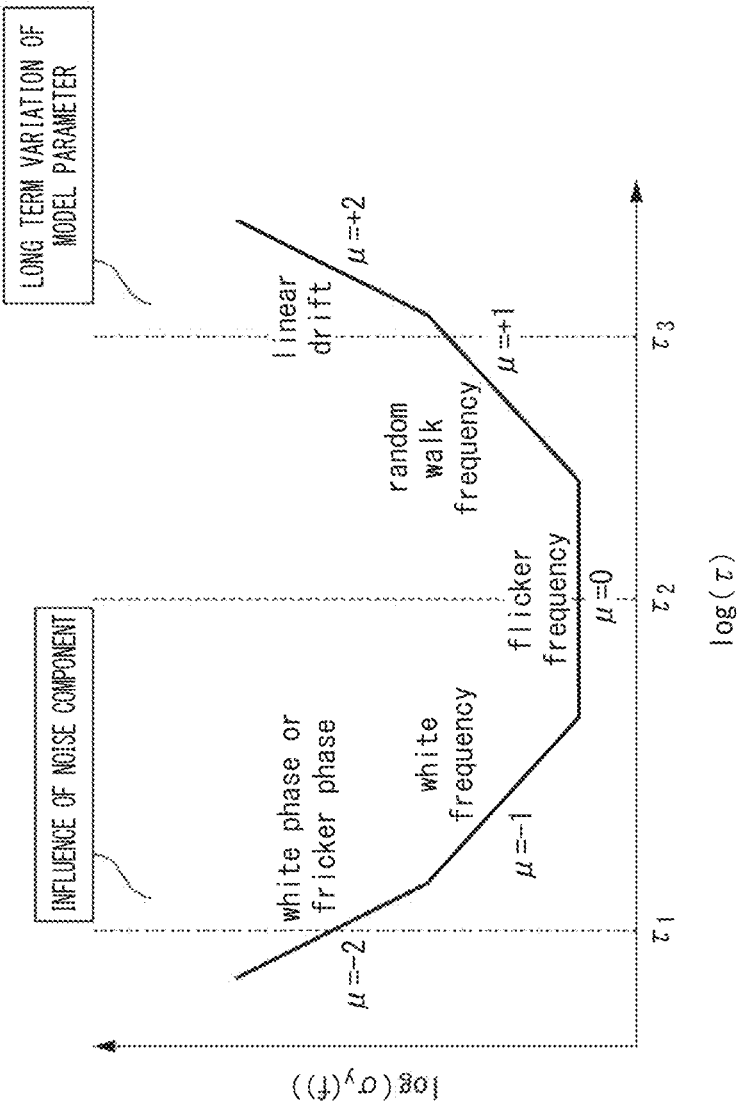
FIG. 7 is a diagram which describes Allan dispersion.

Typical Allan dispersion shows a dispersion as shown in FIG. 7. $\sigma y(f)$ shown in FIG. 7 is a value related to a magnitude of Allan dispersion.

Figure 8:
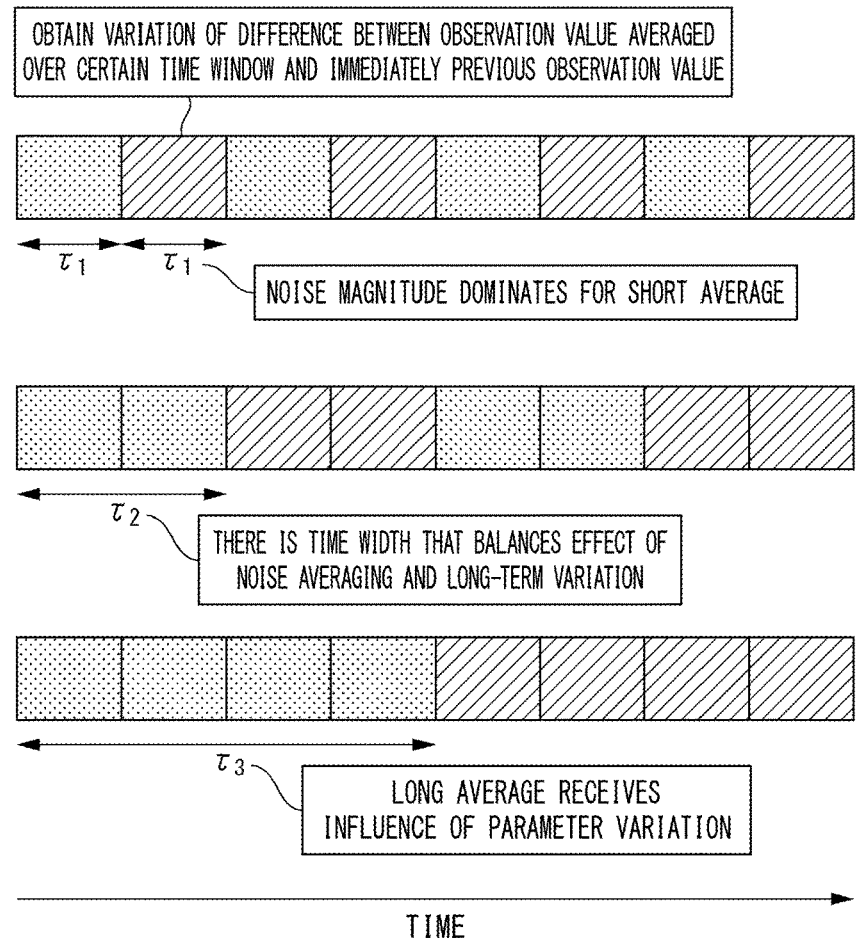
FIG. 8 is a diagram which describes a relationship between Allan dispersion and a time window.

As shown in FIGS. 7 and 8, when an averaging time $\tau$ is short, an influence of noise is dominant and a variation between the average values gradually decreases, and conversely, when the averaging time $\tau$ is extended, an influence of long-term fluctuations in the observation system parameter becomes apparent, and the dispersion gradually increases.

Therefore, for example, the model estimation unit 23 may ideally estimate the parameter PR of the observation model MLO based on record data that minimizes the Allan dispersion.

For example, for the physical quantity estimated value PV that can be estimated from each system, the model estimation unit 23 may also integrate a sum of an average value of the physical quantity estimated values PVs of all systems and a square of an error of the physical quantity estimated value PV of each system over all records using data of the number of records required for estimating each parameter PR from the most recent observation value out of the data within constraints DT2 where there is no abnormality as a single observation value in the observation system constraint determination unit 22. At that time, the model estimation unit 23 may define a reward function for accuracy of estimation on the basis of a magnitude of a penalty coefficient previously determined for an integrated value and a magnitude of a correction term of each parameter PR, and estimate the parameter PR to minimize the value.

For example, the model estimation unit 23 may also estimate the parameters PR such that a total sum of a penalty for a deviation between the physical quantity estimated values PV1s estimated from each system and a penalty for the correction term of each parameter PR is minimized in an observation system from which a common physical quantity estimated value PV1 can be derived by converting values based on each model of the network model NWM1.

Even if the number of observation systems is generally extremely small compared to the number of parameters PR to be estimated, the model estimation unit 23 can estimate the physical quantity estimated value PV1 by using a plurality of records.

For example, the observation model MLO may not be a faithfully modeled observation model, but may be an observation model that simplifies an appropriate range in consideration of usage conditions of the apparatus 1 and specifications of each sensor.

For example, in the observation model MLO for the observation value A1, a penalty for the correction term from an ideal state of a bias and a scale factor (hereinafter also referred to as "SF") may be determined on the basis of sensor accuracy.

The model estimation unit 23 may be configured to define a reward function for a magnitude of a square error average of a difference of each physical quantity estimated value PV1 from an average value of the plurality of physical quantity estimated values PV1s as a deviation between the physical quantity estimated values PV1s estimated from each system in the network model NWM1.

Figure 9:
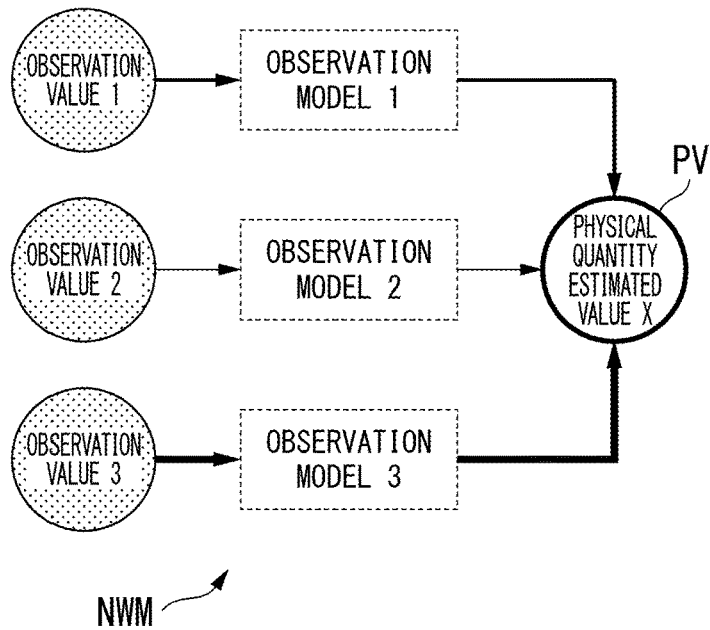
FIG. 9 is a diagram which describes a function of a model estimation unit according to the first embodiment.

For example, as shown in FIG. 9, when each physical quantity estimated value PV can be estimated from three or more different systems in the network model NWM including a plurality of models, the model estimation unit 23 may define a reward function for a magnitude of a square error average of a difference of each physical quantity estimated value PV from an average value of the plurality of physical quantity estimated values PVs as a deviation between the physical quantity estimated values PVs estimated from three or more systems.

Similarly, in the case shown in FIG. 9, the model estimation unit 23 may estimate the parameters PR such that a total sum of the penalty for the deviation between the physical quantity estimated values PVs estimated from three or more systems and the penalty for a correction term of each parameter PR is minimized.

(Configuration of Consistency Determination Unit)

The consistency determination unit 24 determines consistency of a model from a deviation between a first observation value OB1 and a first predicted observation value PA1 predicted from the second observation value OB2 based on the parameters PR of a plurality of models estimated by the model estimation unit 23.

That is, the consistency determination unit 24 can cause an observation value to regress from another observation value on the basis of the estimated parameters PR and evaluate the magnitude of the deviation.

The first predicted observation value PA1 is a value derived by conversion of a value based on each model of the network model NWM1, and is a value corresponding to the first observation value OB1 in the network model NWM1.

For example, the consistency determination unit 24 may compare the first predicted observation value PA1, which is a result of regression predicted based on the parameters PR of each model estimated by the model estimation unit 23, and the first observation value OB1, which is an actual measurement value.

For example, as the consistency of a model, the consistency determination unit 24 may also determine whether the deviation between the first predicted observation value PA1 predicted from the second observation value OB2 and the first observation value OB1 is within a specification range of the first observation system 3.

Figure 10:
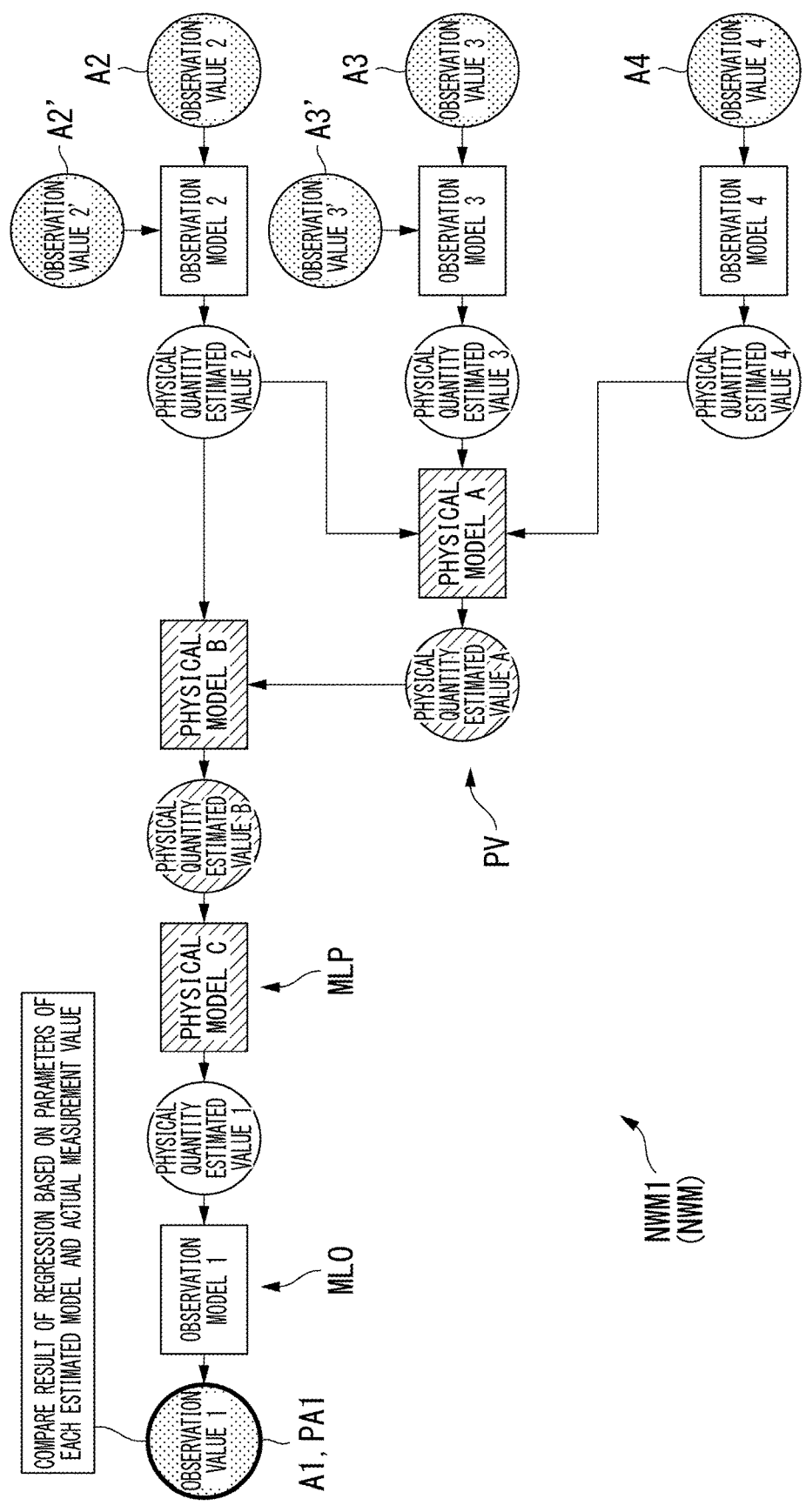
FIG. 10 is a diagram which describes a function of a consistency determination unit according to the first embodiment.

For example, as shown in FIG. 10, as the consistency of a model, the consistency determination unit 24 determines whether the deviation between the first predicted observation value PA1 predicted based on the observation value A2, the observation value A3, and the observation value A4, and the observation value A1 is within the specification range of the first observation system 3.

For example, the consistency determination unit 24 may predict the first predicted observation value PA1 based on the observation value A2, the observation value A3, and the observation value A4 via the plurality of observation models MLOs and the plurality of physical model MLPs in which the parameters PR estimated by the model estimation unit 23 are introduced, and compare the predicted first predicted observation value PA1 with the observation value A1.

For example, the consistency determination unit 24 may acquire a difference between the first predicted observation value PA1 and the first observation value OB1 as the deviation between the first predicted observation value PA1 and the first observation value OB1. At that time, as a determination of the consistency of a model, the consistency determination unit 24 may determine that the plurality of observation model MLOs and the plurality of physical model MLPs into which the parameters PR are introduced are consistent if the acquired difference is equal to or less than a specified threshold value.

For example, the consistency determination unit 24 may perform mutual regression and mutually evaluate consistency with respect to all observation systems.

Figure 11:
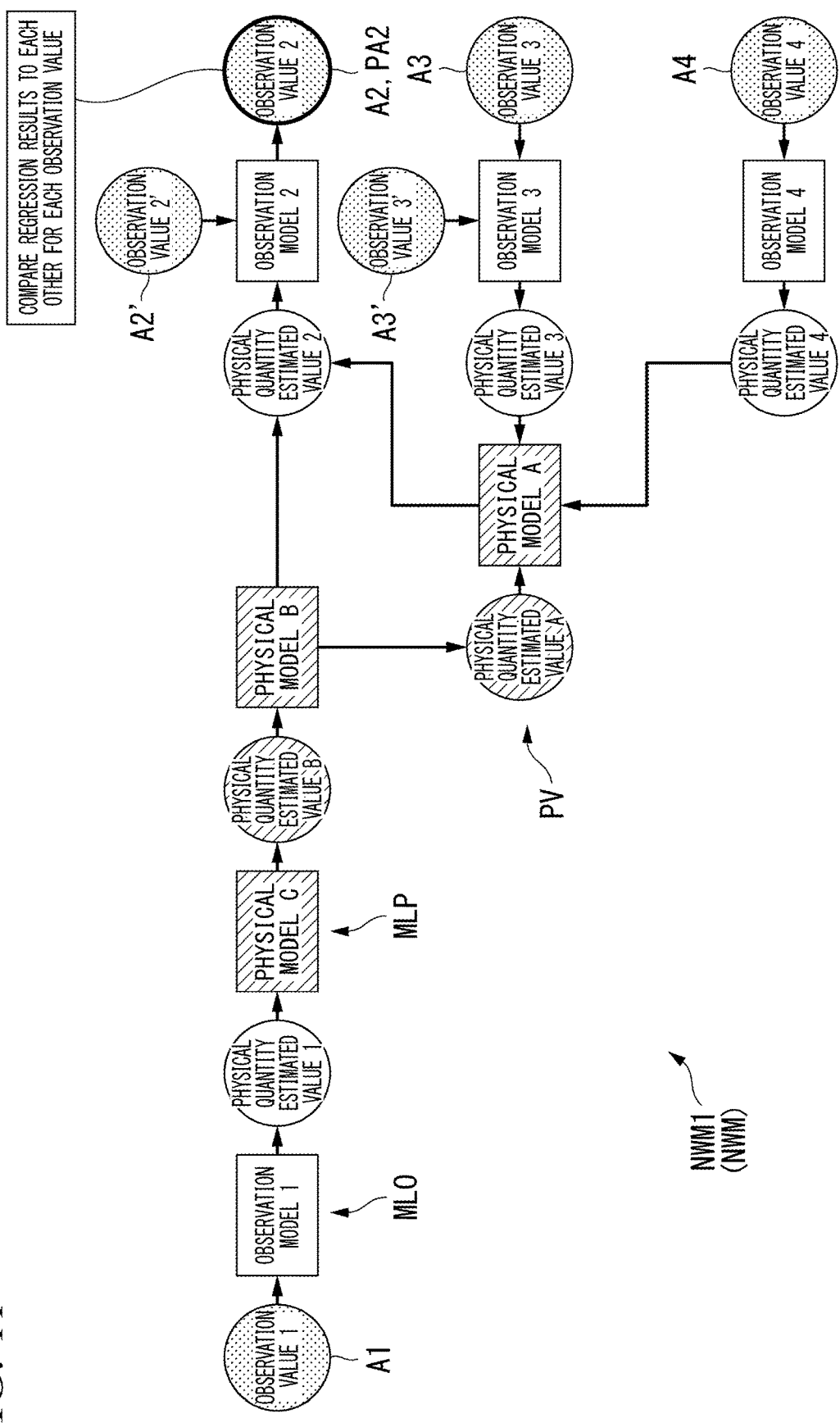
FIG. 11 is a diagram which describes the function of the consistency determination unit according to the first embodiment.

For example, in addition to the evaluation shown in FIG. 10, as shown in FIG. 11, the consistency determination unit 24 may predict a second predicted observation value PA2 based on the observation value A1, the observation value A3, and the observation value A4 via the plurality of observation models MLO and the plurality of physical models MLP in which the parameters PR estimated by the model estimation unit 23 are introduced, and may further compare the predicted second predicted observation value PA2 and the observation value A2.

Furthermore, similarly to the evaluation for the observation value A1 shown in FIG. 10 and the evaluation for the observation value A2 shown in FIG. 11, the consistency determination unit 24 may perform evaluation for the observation value A3 on the basis of the observation value A1, the observation value A2, and the observation value A4, or may also perform evaluation for the observation value A4 on the basis of the observation value A1, the observation value A2, and the observation value A3.

Figure 12:
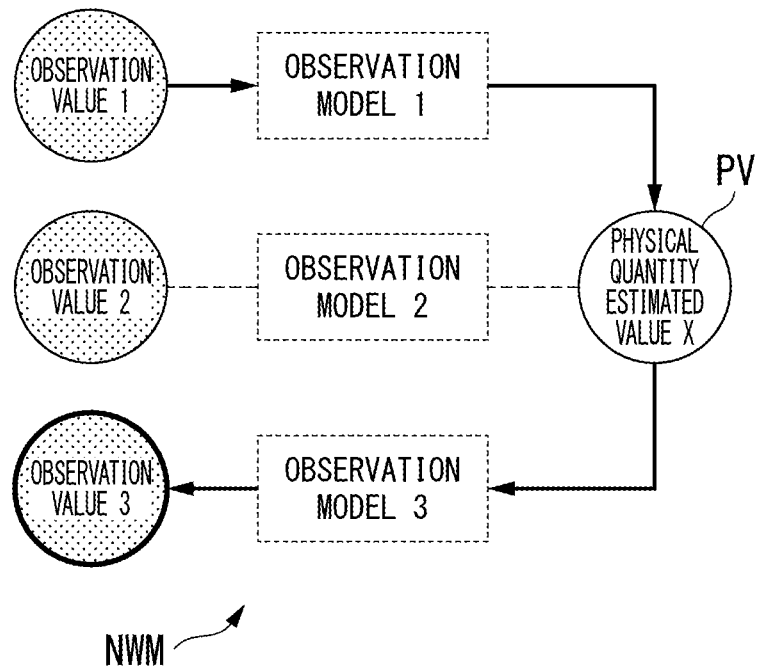
FIG. 12 is a diagram which describes the function of the consistency determination unit according to the first embodiment.
Figure 13:
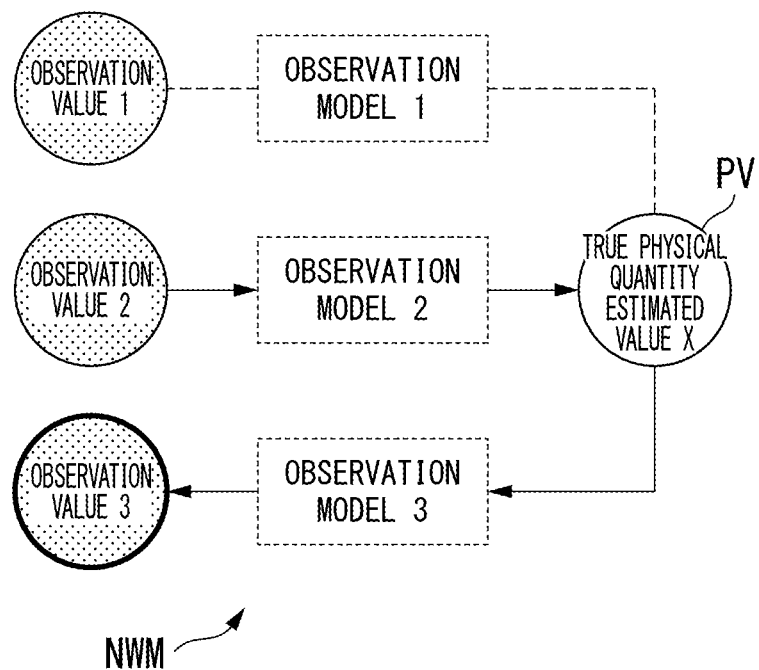
FIG. 13 is a diagram which describes the function of the consistency determination unit according to the first embodiment.

For example, as shown in FIGS. 12 and 13, when there are a plurality of independent systems regressing to the same observation value, the consistency determination unit 24 may obtain a deviation for each regressing system, and use a minimum value of a plurality of obtained deviations as an evaluation result of an observation value.

(Configuration of Physical Quantity Constraint Determination Unit)

The physical quantity constraint determination unit 25 determines whether the physical quantity estimated value PV estimated based on the parameter PR is within a second constraint R2.

For example, the physical quantity constraint determination unit 25 may determine whether the physical quantity estimated value PV estimated based on the physical model MLP including the parameter PR that is determined to be consistent in the consistency determination unit 24 and an observation value of the data within constraints DT2 is within the second constraint R2.

For example, the second constraint R2 may be a predetermined numerical range that indicates a physical quantity within a design level (specification) of the apparatus 1. For example, the physical quantity constraint determination unit 25 may determine that the physical quantity estimated value PV is normal if it is within the second constraint R2, and that it is abnormal if it is not within the second constraint R2. When it is determined to be normal, the parameter PR introduced into each model can be considered valid in the determination of the physical quantity constraint determination unit 25.

For example, when the physical quantity estimated value PV is determined to be abnormal, the physical quantity constraint determination unit 25 may determine that the apparatus 1 is abnormal.

In other words, based on an assumption that the physical quantity of the data within constraints DT2, which is a record determined to be normal, has been estimated, if the physical quantity estimated value PV, which is the physical quantity, does not fall within the constraints of design specifications, it can be regarded as an abnormality of the apparatus 1.

For example, when each observation value of the data within constraints DT2 is discrete in terms of time due to an application of the first constraint R1, the physical quantity constraint determination unit 25 may time-interpolate each discrete observation value, and estimate the physical quantity estimated value PV based on each observation value of the time-interpolated data within constraints DT2.

For example, the physical quantity constraint determination unit 25 may determine whether the physical quantity estimated value PV estimated at each time step is within the second constraint R2.

For example, the physical quantity constraint determination unit 25 compares each estimated physical quantity estimated value PV with a design level (specification), and determines whether it is within the specification, above the specification, or below the specification, thereby converting it into discretized data of about 2 to 7 steps.

(Configuration of Model Constraint Determination Unit)

The model constraint determination unit 26 determines whether each parameter PR is within a third constraint R3.

For example, the model constraint determination unit 26 may determine whether each parameter PR that is determined to be consistent in the consistency determination unit 24 is within the third constraint R3.

For example, the third constraint R3 for each parameter PR in the physical model MLP may be a specified numerical range that indicates a parameter within the design level (specification) of the apparatus 1.

For example, the third constraint R3 for each parameter PR in the observation model MLO may be a specified numerical range that indicates the parameter within a design level (specification) of each observation value.

For example, the model constraint determination unit 26 may determine that each parameter PR is normal if it is within the third constraint R3, and that it is abnormal if it is not within the third constraint R3. When it is determined to be normal, each parameter PR introduced into each model can be considered valid in the determination of the model constraint determination unit 26.

For example, each parameter PR determined in the model constraint determination unit 26 may be each parameter estimated for each moving window or batch window in which mutual regression is performed.

For example, the model constraint determination unit 26 compares each parameter PR to be estimated with a design level (specification), and determines whether it is within the specification, above the specification, or below the specification, thereby converting it into discretized data of about 2 to 7 steps.

For example, when the parameter PR of the physical model MLP is determined to be abnormal, the model constraint determination unit 26 may determine that the apparatus 1 is abnormal.

That is, based on an assumption that parameter estimation is performed correctly, if the parameter PR of the physical model MLP does not fall within the design specification constraints, it can be regarded as an abnormality of the apparatus 1.

For example, when the parameter PR of the observation model MLO is determined to be abnormal, the model constraint determination unit 26 may determine that the observation system is abnormal. Furthermore, the model constraint determination unit 26 may determine that a sensor associated with the observation model MLO having the parameter PR determined to be abnormal is abnormal.

In other words, based on the assumption that parameter estimation is performed correctly, if the parameter PR of the observation model MLO does not fall within the design specification constraints, it can be regarded as an abnormality of the observation system.

(Configuration of Output Unit)

The output unit 27 outputs the parameter PR determined to be normal and the physical quantity estimated value PV estimated based on the parameter PR.

In addition, the output unit 27 outputs the parameter PR determined to be abnormal and the physical quantity estimated value PV estimated based on the parameter PR.

For example, when the parameter PR determined to be abnormal is the parameter PR of the observation model MLO, the output unit 27 may output that the sensor related to the observation model MLO having the parameter PR determined to be abnormal is abnormal.

For example, the output unit 27 may output that the apparatus 1 is abnormal when the parameter PR determined to be abnormal is the parameter PR of the physical model MLP.

(Operation)

An operation of the estimation device 2 of the present embodiment will be described.

The operation of the estimation device 2 corresponds to the estimation method of the present embodiment.

Figure 14:
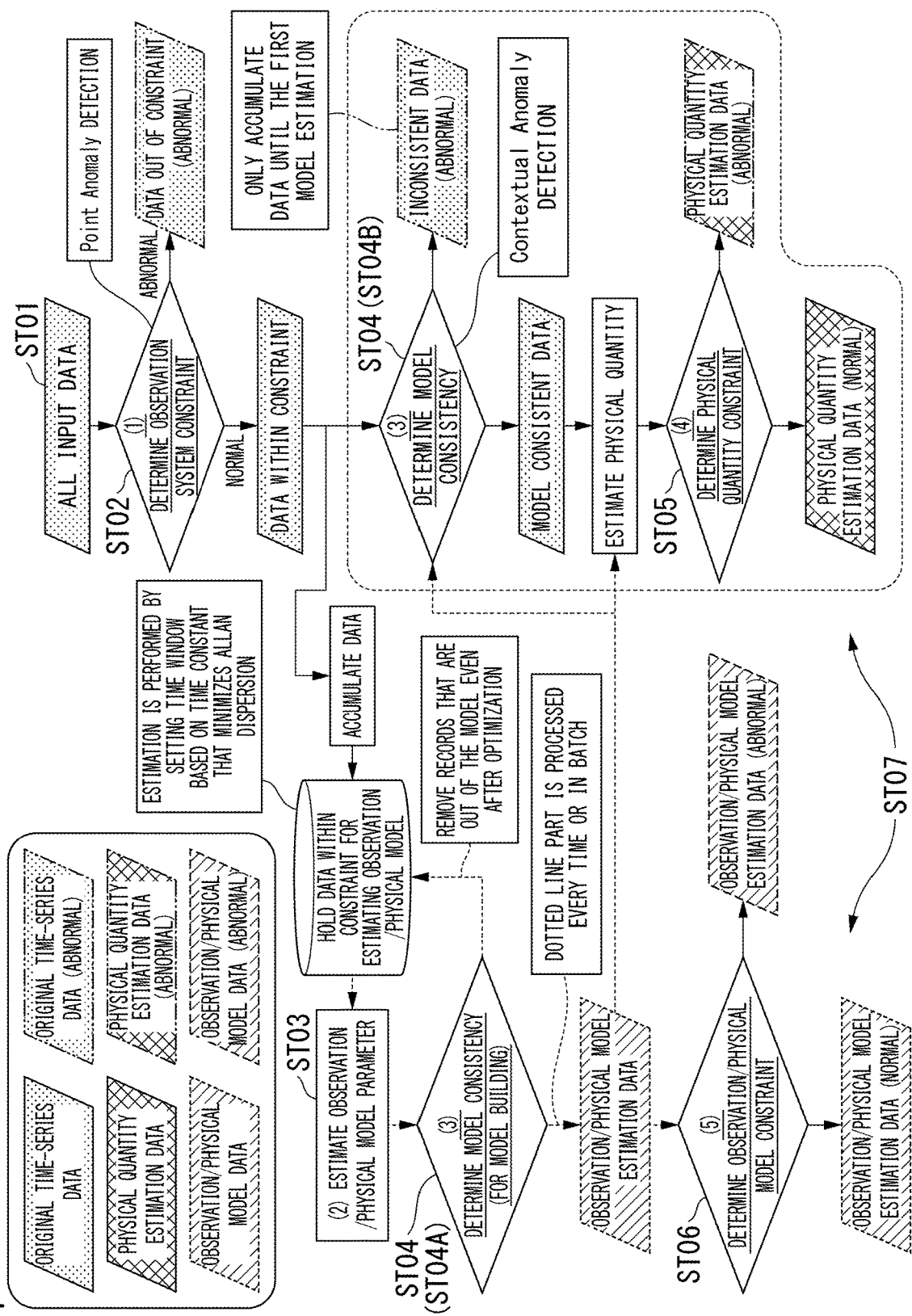
FIG. 14 is a diagram which describes a flowchart of an estimation method according to the first embodiment.

The operation of the estimation device 2 may also be performed, for example, as shown in FIG. 14.

First, the acquisition unit 21 acquires the first observation value OB1 observed by the first observation system 3 and the second observation value OB2 observed by the second observation system 4 (ST01: acquisition step).

After ST01 is performed, the observation system constraint determination unit 22 determines the data within constraints DT2, which is data within the first constraint R1, from the time series data DT1 of each observation value of the first observation value OB1 and the second observation value OB2 (ST02: observation system constraint determination step).

After ST02 is performed, the model estimation unit 23 estimates the parameters PR of a plurality of models including the observation model MLO, which is a model of each observation system, and the physical model MLP, which is a model in the apparatus 1 provided with an observation system, on the basis of the data within constraints DT2 (ST03: model estimation step).

After ST03 is performed, the consistency determination unit 24 determines the consistency of a model from the deviation between the first observation value OB1 and the first predicted observation value PA1 predicted from the second observation value OB2 based on the parameters PR of a plurality of models estimated by the model estimation unit 23 (ST04: consistency determination step).

For example, in ST04, the consistency determination unit 24 may determine that there is an abnormality in an observation model or a physical model when the deviation is greater than a specified value (ST04A). At that time, the consistency determination unit 24 may delete records that deviate from a model even after being optimized. For example, after ST04A is performed, the consistency determination unit 24 may determine inconsistent data in the data within constraints DT2 and exclude it from the data within constraints DT2 as abnormal data (ST04B).

For example, after ST04 is performed, the physical quantity constraint determination unit 25 may determine whether the physical quantity estimated value PV estimated based on the parameter PR is within the second constraint R2 (ST05: physical quantity constraint determination step).

For example, in parallel with ST05, the model constraint determination unit 26 may determine whether each parameter PR is within the third constraint R3 (ST06: model constraint determination step).

For example, after ST04 and ST05 are performed, the output unit 27 may output a parameter PR determined to be normal and a physical quantity estimated value PV estimated based on the parameter PR, and output a parameter PR determined to be abnormal and a physical quantity estimated value PV estimated based on the parameter PR (ST07: output step).

(Action and Effect)

According to the present embodiment, the estimation device 2 can estimate the parameters PR of a plurality of models including the observation model MLO and the physical model MLP, and compare observation values obtained based on different observation systems to each other.

For this reason, the estimation device 2 can evaluate the consistency of the observation values.

Therefore, estimation device 2 is easy to estimate the consistency of the observation values.

In addition, according to the present embodiment, the consistency determination unit 24 determines the estimated consistency of a model.

A model estimated by the model estimation unit 23 is a best effort with the parameter PR adjusted to minimize the deviation, and the like, and it is unclear whether the model is capable of estimating a correct observation value.

Therefore, in the present embodiment, since the consistency determination unit 24 determines the consistency of the estimated model, it is possible to determine whether the estimated observation value falls within, for example, a compensation target accuracy.

In addition, according to one example of the present embodiment, the estimation device 2 further includes the physical quantity constraint determination unit 25, so it can determine whether the physical quantity within the apparatus 1 is normal.

Therefore, according to the estimation device 2, the user can recognize an abnormality of the apparatus 1 itself.

Moreover, according to one example of the present embodiment, the estimation device 2 further includes the model constraint determination unit 26, so it can determine whether each parameter PR is normal.

Therefore, according to the estimation device 2, the user can distinguish between the abnormality of the apparatus 1 itself and an abnormality caused by an observation system.

Furthermore, a more detailed diagnosis of the apparatus 1 is possible by estimating the physical quantity inside the apparatus 1 and the parameters PR of the observation model MLO and the physical model MLP, which cannot be estimated by ordinary observation alone.

As a comparative example, here is a case of detecting an abnormality in an observation system by installing 2 to 3 sensors for the same observation value and performing redundant measurements.

In this case, it is necessary to install a plurality of sensors for the same observation value, which increases manufacturing cost for a new apparatus, and cost for sensor installation may occur in an existing apparatus or service may not be applied.

In addition, a similar method only guarantees a fact that the observation value is not abnormal, and it may not be possible to provide an internal state quantity for estimating a cause of an abnormality of an apparatus itself.

On the other hand, according to the estimation device 2, which is an example of the present embodiment, since an abnormality in an observation system can be determined based on different observation values, for example, it is possible to have a configuration in which a plurality of sensors are not attached with respect to the same observation value.

Furthermore, the estimation device 2, which is an example of the present embodiment, can provide an internal state of the apparatus 1 itself such that the abnormality of the apparatus 1 itself can be distinguished from the abnormality caused by an observation system.

Further, according to an example of the present embodiment, since the model estimation unit 23 obtains a deviation between the physical quantity estimated values estimated from each of three or more systems in the network model NWM including a plurality of models, the estimation device 2 can compare three or more physical quantity estimated values to each other.

For this reason, the estimation device 2 can estimate a more likely model.

Second Embodiment

The estimation device 2 according to a second embodiment will be described with reference to the drawings.

A configuration of the estimation device 2 of the present embodiment is the same as that of the first embodiment except for points to be described below.
(Configuration)

Figure 15:
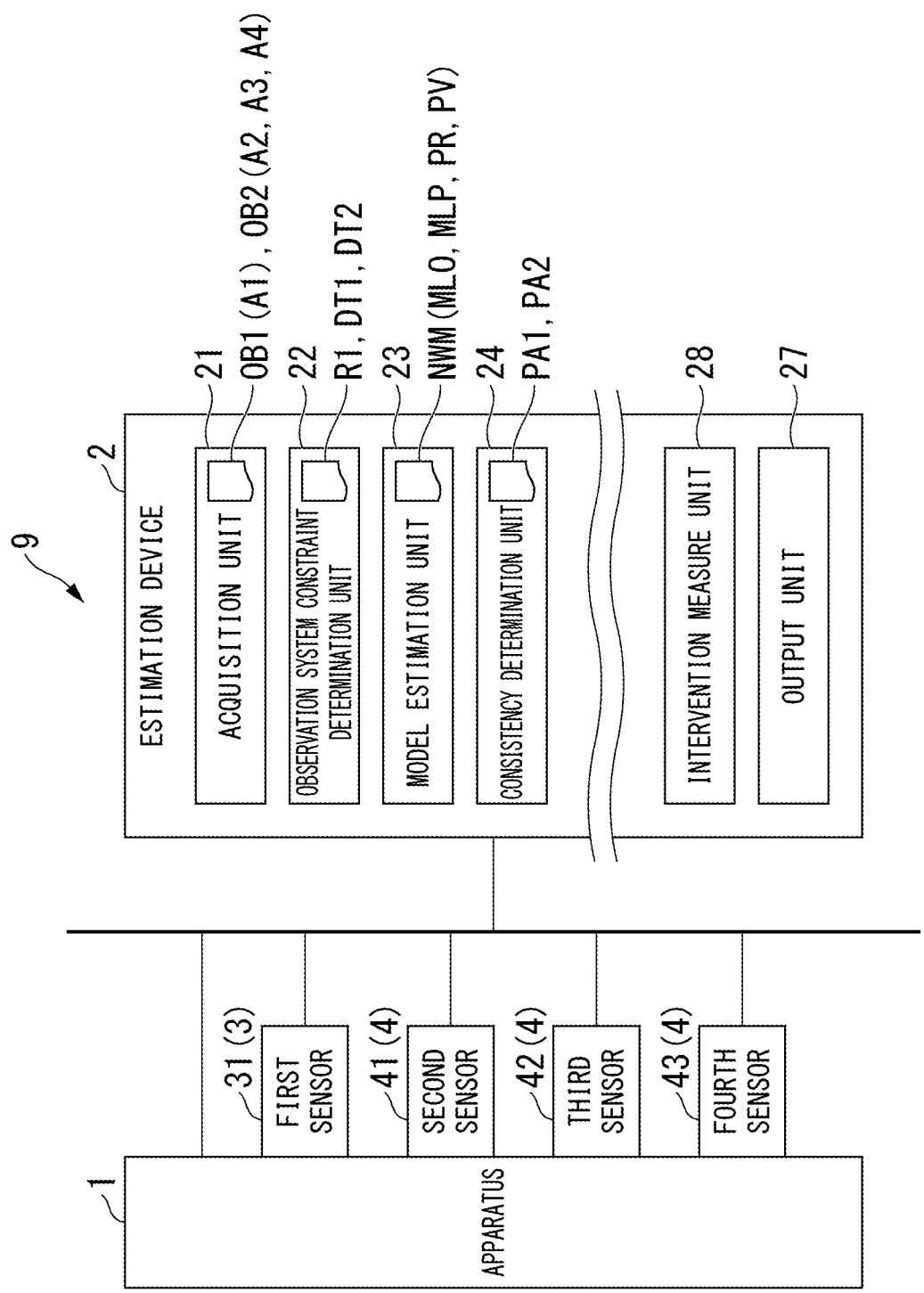
FIG. 15 is a block diagram of an observation device according to a second embodiment.

For example, as shown in FIG. 15, the estimation device 2 may further include an intervention measure unit 28.

Figure 16:
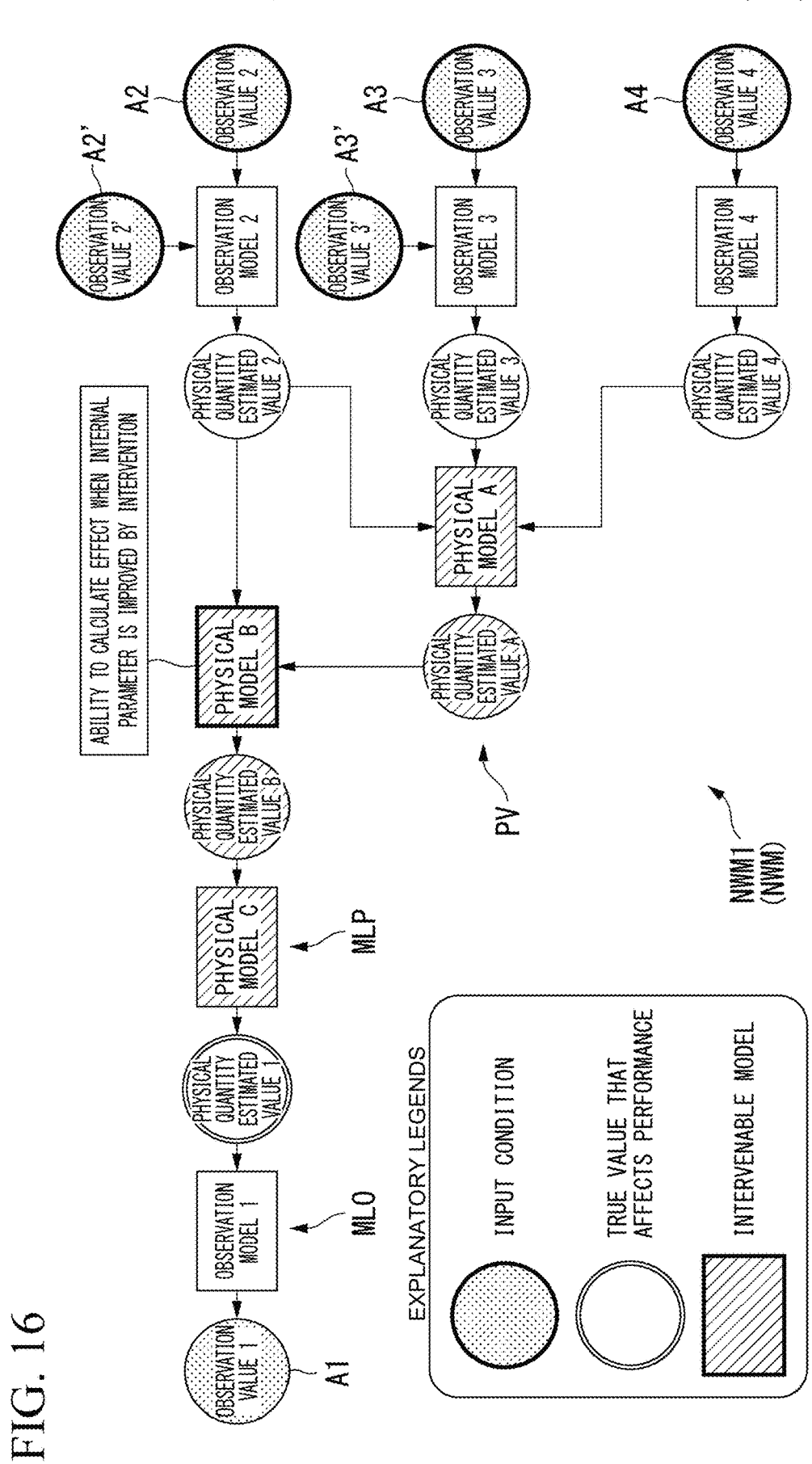
FIG. 16 is a diagram which describes a function of an intervention measure unit according to the second embodiment.

As shown in FIG. 16, the intervention measure unit 28 can change the parameter PR by intervention to the physical model MLP. At that time, the estimation device 2 can estimate each physical quantity estimated value PV, which is a true value that affects the performance of the apparatus 1, according to the intervened physical model MLP, using an observation value as an input condition.

For example, the output unit 27 may output a parameter PR including the changed parameter PR and a physical quantity estimated value PV estimated based on the changed parameter PR.

For example, the intervention measure unit 28 may change the parameter PR according to a parameter input by the user.

In this embodiment, the estimation device 2 may or may not include the physical quantity constraint determination unit 25 and the model constraint determination unit 26.
(Operation)

An operation of the estimation device 2 of the present embodiment will be described.

The operation of the estimation device 2 corresponds to the estimation method of the present embodiment.

Figure 17:
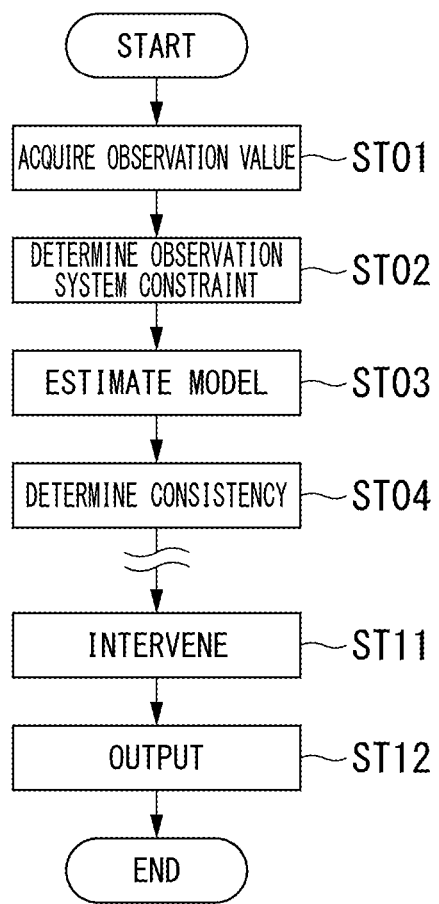
FIG. 17 is a flowchart of an observation method according to the second embodiment.

The operation of the estimation device 2 may be performed, for example, as shown in FIG. 17.

First, the estimation device 2 performs ST01 to ST04 in the same manner as in the first embodiment.

For example, after ST04 is performed, the intervention measure unit 28 may change the parameter PR by intervention to the physical model MLP (ST11: intervention step). At that time, the output unit 27 may output the parameter PR including the changed parameter PR and the physical quantity estimated value PV estimated based on the changed parameter PR (ST12: input step).

In this embodiment, the estimation device 2 may or may not perform ST05 to ST07 of the first embodiment.
(Action and Effect)

The present embodiment has the same actions and effects as in the first embodiment.

In addition, according to one example of the present embodiment, the estimation device 2 can simulate an influence of changes in the parameter PR in the physical model MLP on the performance of the apparatus 1.

For this reason, according to the estimation device 2, the user can evaluate the performance of the apparatus 1.

Moreover, according to one example of the present embodiment, the estimation device 2 can calculate the influence on the performance of the apparatus 1 quantitatively when the parameter PR is improved to a form close to the specification by intervention with respect to the parameter of the physical model MLP estimated on the basis of a current state of the apparatus 1.

This allows the user to ascertain an appropriate timing for performing intervention measures.

Third Embodiment

The estimation device 2 according to a third embodiment will be described with reference to the drawings.

A configuration of the estimation device 2 of the present embodiment is the same as in the second embodiment except for points to be described below.
(Configuration)

Figure 18:
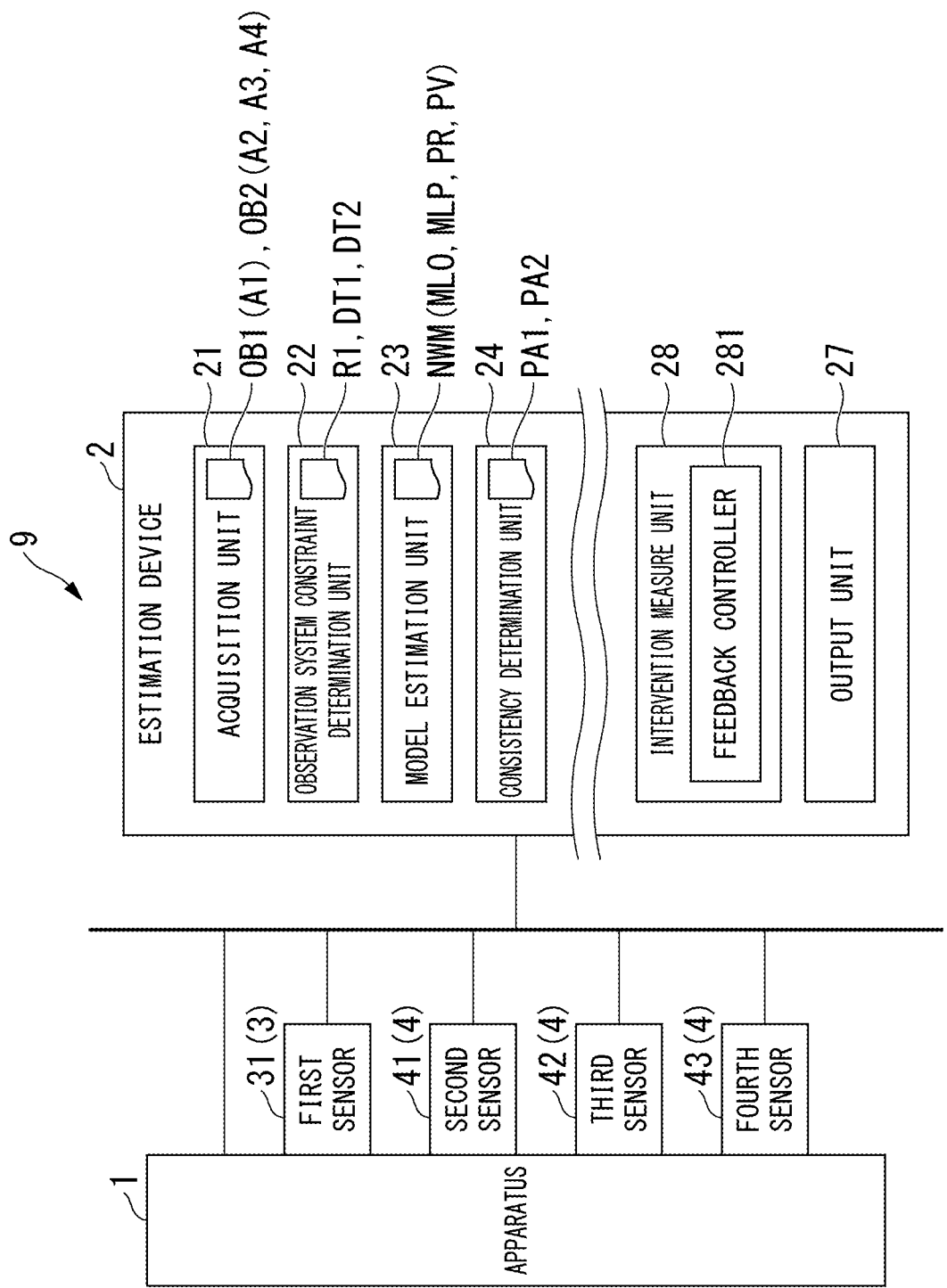
FIG. 18 is a block diagram of an observation device according to a third embodiment.

For example, as shown in FIG. 18, the intervention measure unit 28 may also include a feedback controller 281.

Figure 19:
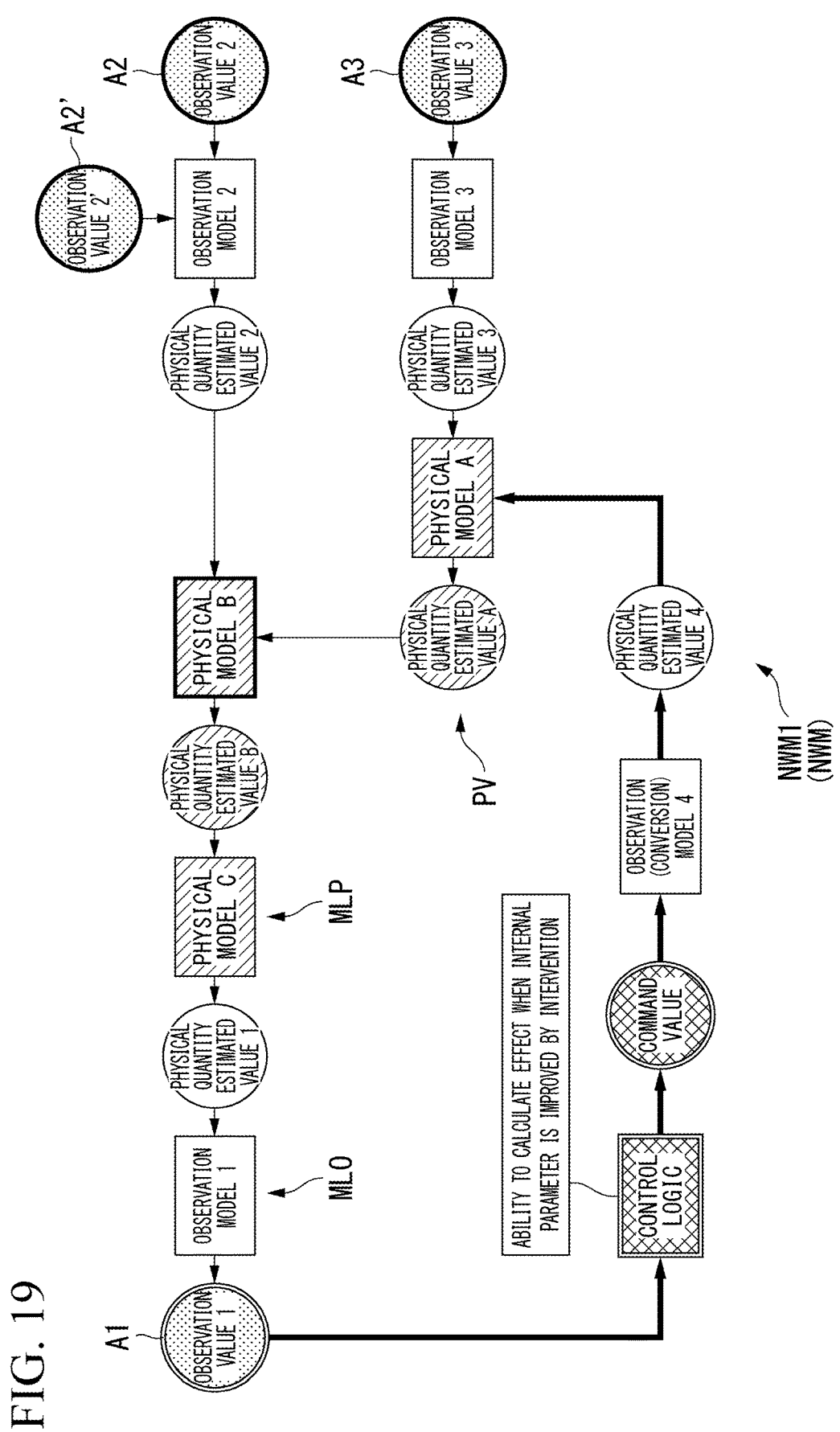
FIG. 19 is a diagram which describes a function of an intervention measure unit according to the third embodiment.

As shown in FIG. 19, the feedback controller 281 feeds back the first observation value OB1 to the physical model MLP to change the parameter PR.

For example, the feedback controller 281 may determine an instruction value by control logic based on the first observation value OB1, feed it back to the physical model MLP via the observation model MLO, and change the parameter PR.

Also in the present embodiment, the estimation device 2 may or may not include the physical quantity constraint determination unit 25 and the model constraint determination unit 26.

(Operation)

The operation of the estimation device 2 corresponds to the estimation method of the present embodiment.

The operation of the estimation device 2 of the present embodiment may be performed, for example, as shown in FIG. 17 in the same manner as in the second embodiment.

Even in the present embodiment, the estimation device 2 may or may not perform ST05 to ST07 of the first embodiment.

(Action Effect)

The present embodiment has the same actions and effects as in the second embodiment.

In addition, according to one example of the present embodiment, the intervention measure unit 28 can feed back the first observation value OB1 to the parameter PR in the physical model MLP.

For this reason, the user can simulate a control parameter for feedback control of the apparatus 1 according to an observation value.

Therefore, according to the estimation device 2, the user can evaluate the control parameter.

In addition, according to one example of this embodiment, the estimation device 2 can estimate internal parameters of the observation model MLO and the physical model MLP estimated on the basis of the current state of the apparatus 1 according to operations up to ST04.

For this reason, the estimation device 2 can accurately simulate what kind of response the observation value that performs feedback control to an input condition will show.

Therefore, according to the estimation device 2, an effective efficiency improvement can be realized by optimizing a control parameter such as a PID gain in the control logic on the basis of a simulated model and an operation performance of the apparatus 1.

Modified Example

In each of the embodiments described above, the model estimation unit 23 includes the network model NWM, but may be constructed in any manner as long as the parameter PR can be estimated.

For example, the model estimation unit 23 may estimate the parameter PR of the network model NWM stored outside the estimation device 2 by communicating with the outside of the estimation device 2.

<Hardware Configuration of Computer>

In each of the embodiments described above, it is assumed that various types of processing are performed by recording a program for realizing various functions of the estimation device 2 in a computer-readable recording medium, and causing the program recorded in this recording medium to be read and executed by a computer system such as a microcomputer. Here, various types of processing of the CPU of the computer system are stored in the computer-readable recording medium in a form of a program, and the various types of processing are performed by a computer reading and executing the program. The computer-readable recording medium refers to a magnetic disk, a magneto-optical disc, a CD-ROM, a DVD-ROM, a semiconductor memory, or the like. In addition, this computer program may be distributed to the computer via a communication line, and the computer having received this distribution may execute the program.

In each of the above embodiments, an example of a hardware configuration of a computer that executes a program for realizing various functions of the estimation device 2 will be described.

Figure 20:
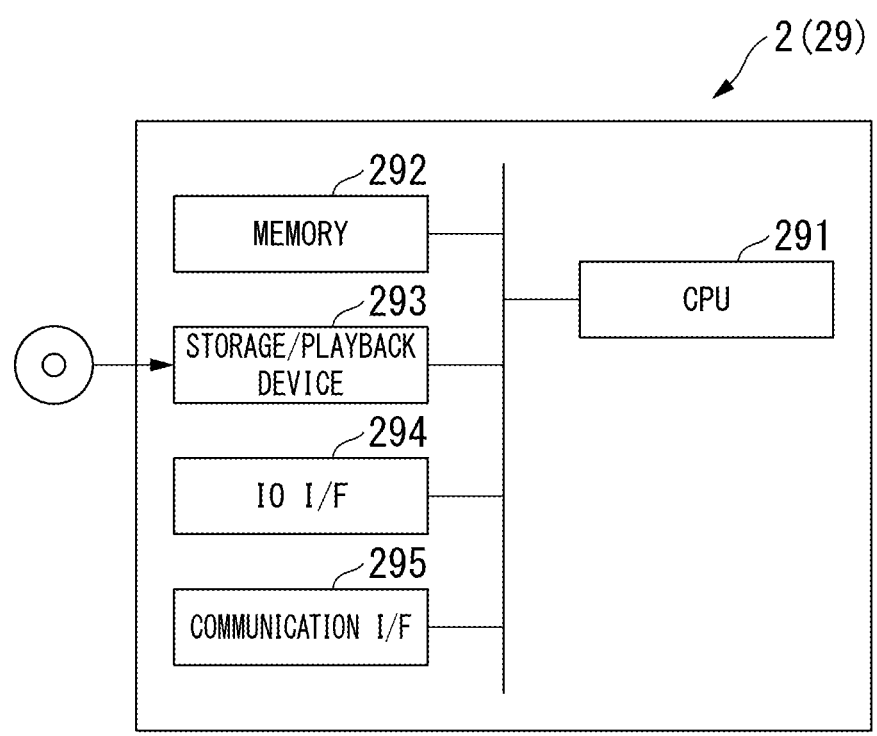
FIG. 20 is a diagram which shows an example of a hardware configuration of a computer included in an estimation device according to each embodiment.

As shown in FIG. 20, the computer 29 included in the estimation device 2 includes a CPU 291, a memory 292, a storage/playback device 293, an input/output interface (hereinafter referred to as "IO I/F") 294, and a communication interface (hereinafter, referred to as a "communication I/F") 295.

The memory 292 is a medium such as a random access memory (hereinafter referred to as "RAM") that temporarily stores data and the like used by a program executed by the estimation device 2.

A storage/playback device 293 is a device for storing data and the like in external media such as a CD-ROM, a DVD, a flash memory, and the like, and for playing back data and the like in the external media.

The IO I/F 294 is an interface for inputting and outputting information between the estimation device 2 and other devices.

The communication I/F 295 is an interface that performs communication between the estimation device 2 and other devices via communication lines such as the Internet and dedicated communication lines.

Other Embodiments

Although the embodiments of the present disclosure have been described above, these embodiments are presented as examples and are not intended to limit the scope of the disclosure. These embodiments can be implemented in various other forms, and various omissions, replacements, and changes can be made within a range not departing from the gist of the disclosure. These embodiments and modifications thereof are included in the scope and gist of the disclosure.

<Appendix>

The estimation device, estimation method, and recording medium storing the program described in the embodiments described above are ascertained, for example, as follows.

(1) The estimation device 2 of a first aspect includes the observation system constraint determination unit 22 configured to determine the data within constraints DT2 that is data within the first constraint R1 based on the time series data DT1 of each observation value of the first observation value OB1 observed by the first observation system 3 and the second observation value OB2 observed by the second observation system 4, the model estimation unit 23 configured to estimate parameters PR of a plurality of models including the observation model MLO that is a model of each of the observation systems and the physical model MLP that is a model within the apparatus 1 provided with each of the observation systems based on the data within constraints DT2, and the consistency determination unit 24 configured to determine consistency of the models based on a deviation between a first predicted observation value PA1 predicted from the second observation system 4 based on the estimated parameters PR and the first observation value OB1.

According to the present aspect, the estimation device 2 can compare observation values obtained based on different observation systems to each other by estimating the parameters PR of the plurality of models including the observation model MLO and the physical model MLP.

For this reason, the estimation device 2 can evaluate the consistency of the observation values.

Therefore, the estimation device 2 is likely to estimate the consistency of the observation values.

(2) The estimation device 2 of a second aspect is the estimation device 2 of (1) further including the physical quantity constraint determination unit 25 configured to determine whether the physical quantity estimated value PV that is a physical quantity within the apparatus 1 estimated based on the parameters PR is within the second constraint R2.

According to the present aspect, the estimation device 2 can determine whether the physical quantity in the apparatus 1 is normal.

Therefore, according to the estimation device 2, the user can recognize abnormalities of the apparatus 1 itself.

(3) The estimation device 2 of a third aspect is the estimation device 2 of (1) or (2) further including a model constraint determination unit configured to determine whether each parameter is within the third constraint R3.

According to the present aspect, the estimation device 2 can determine whether each parameter PR is normal.

Therefore, according to the estimation device 2, the user can distinguish between the abnormality of the apparatus 1 itself and the abnormality caused by an observation system.

(4) The estimation device 2 of a fourth aspect is the estimation device 2 of (1) in which the model estimation unit 23 obtains a deviation between physical quantity estimated values PVs that are physical quantities within the apparatus 1 and are estimated based on the parameters from each of three or more systems in the network model NWM including the plurality of models.

According to the present aspect, the estimation device 2 can compare three or more physical quantity estimated values to each other.

For this reason, estimation device 2 can estimate a more likely model.

(5) The estimation device 2 of a fifth aspect is the estimation device 2 of any one of (1) to (4) further including the intervention measure unit 28 capable of changing the parameters PR by intervention to the physical model MLP.

According to the present aspect, the estimation device 2 can simulate an influence of changes in the parameter PR in the physical model MLP on the performance of the apparatus 1.

For this reason, according to the estimation device 2, the user can evaluate the performance of the apparatus 1.

(6) The estimation device 2 of a sixth aspect is the estimation device 2 of (5) in which the intervention measure unit 28 includes the feedback controller 281 configured to feed back the first observation value OB1 to the physical model MLP and to change the parameters PRs.

According to the present aspect, the intervention measure unit 28 can feed back the first observation value OB1 to the parameters PR in the physical model MLP.

For this reason, the user can simulate a control parameter for feedback control of the apparatus 1 according to an observation value.

Therefore, according to the estimation device 2, the user can evaluate the control parameter.

(7) An estimation method of a seventh aspect includes a step of determining the data within constraints DT2 that is data within the first constraint R1 based on the time series data DT1 of each observation value of the first observation value OB1 observed by the first observation system 3 and the second observation value OB2 observed by the second observation system 4, a step of estimating the parameters PR of a plurality of models including the observation model MLO that is a model of each of the observation systems and the physical model MLP that is a model within the apparatus 1 provided with each of the observation systems based on the data within constraints DT2, and a step of determining consistency of the models based on a deviation between the first predicted observation value PA1 predicted from the second observation system 4 based on the estimated parameters PR and the first observation value OB1.

According to the present aspect, the estimation method can compare observation values obtained based on different observation systems to each other by estimating the parameters PR of the plurality of models including the observation model MLO and the physical model MLP.

For this reason, the estimation method can evaluate the consistency of the observation values.

Therefore, the estimation method makes it easy to estimate the consistency of the observation values.

(8) A non-transitory computer-readable recording medium that stores a program of an eighth aspect causes a computer of the estimation device 2 to execute a step of determining the data within constraints DT2 that is data within the first constraint R1 based on the time series data DT1 of each observation value of the first observation value OB1 observed by the first observation system 3 and the second observation value OB2 observed by the second observation system 4, a step of estimating the parameters PR of a plurality of models including the observation model MLO that is a model of each of the observation systems and the physical model MLP that is a model within the apparatus 1 provided with each of the observation systems based on the data within constraints DT2, and a step of determining consistency of the models based on a deviation between the first predicted observation value PA1 predicted from the second observation system 4 based on the estimated parameters PR and the first observation value OB1.

According to the present aspect, the estimation device 2 on which the program is executed can compare observation values obtained based on different observation systems to each other by estimating the parameters PR of the plurality of models including the observation model MLO and the physical model MLP.

For this reason, the estimation device 2 on which the program is executed can evaluate the consistency of the observation values.

Therefore, the estimation device 2 on which the program is executed is likely to estimate the consistency of the observation values.

INDUSTRIAL APPLICABILITY

According to the aspect described above, it is easy to estimate the consistency of observation values.

REFERENCE SIGNS LIST

1 Apparatus
2 Estimation device
3 First observation system
4 Second observation system
21 Acquisition unit
22 Observation system constraint determination unit
23 Model estimation unit
24 Consistency determination unit
25 Physical quantity constraint determination unit
26 Model constraint determination unit
27 Output unit
28 Intervention measure unit
29 Computer 31 First sensor
41 Second sensor
42 Third sensor
43 Fourth sensor
281 Feedback controller
291 CPU
292 Memory
293 Storage/playback device
294 IO I/F
295 Communication I/F
A1 Observation value
A2 Observation value
A2' Observation value
A3 Observation value
A3' Observation value
A4 Observation value
DT1 Time series data
DT2 Data within constraints
DT3 Data
DT4 Data
DT5 Data
MLO Observation model
MLP Physical model
MLPA Physical model
MLPB Physical model
MLPC Physical model
NWM Network model
NWM1 Network model
OB1 First observation value
OB2 Second observation value
PA1 First predicted observation value
PA2 Second predicted observation value
PR Parameter
PV Physical quantity estimated value
PV1 Physical quantity estimated value
PV2 Physical quantity estimated value
PV3 Physical quantity estimated value
PV4 Physical quantity estimated value
PVA Physical quantity estimated value
PVB Physical quantity estimated value
R1 First constraint
R2 Second constraint
R3 Third constraint

The invention claimed is:

1. An estimation device comprising:
an observation system constraint determination unit configured to determine data within constraints that is data within a first constraint based on time series data of each observation value of a first observation value observed by a first observation system and a second observation value observed by a second observation system;
a model estimation unit configured to estimate parameters of a plurality of models including an observation model that is a model of each of the observation systems and a physical model that is a model within an apparatus provided with each of the observation systems based on the data within constraints; and
a consistency determination unit configured to determine consistency of the models based on a deviation between a first predicted observation value predicted from the second observation system based on the estimated parameters and the first observation value.

2. The estimation device according to claim 1, further comprising:
a physical quantity constraint determination unit configured to determine whether a physical quantity estimated value that is a physical quantity within the apparatus estimated based on the parameters is within a second constraint.

3. The estimation device according to claim 1, further comprising:
a model constraint determination unit configured to determine whether each parameter is within a third constraint.

4. The estimation device according to claim 1, wherein the model estimation unit obtains a deviation between physical quantity estimated values that are physical quantities within the apparatus and are estimated based on the parameters from each of three or more systems in a network model including the plurality of models.

5. The estimation device according to claim 1, further comprising:
an intervention measure unit capable of changing the parameters by intervention to the physical model.

6. The estimation device according to claim 5, wherein the intervention measure unit includes a feedback controller configured to feed back the first observation value to the physical model and to change the parameters.

* * * * *